United States Patent

[11] 3,599,862

| [72] | Inventors | William John Hogan<br>Glen Cove;<br>Vito Michael Liantonio, Douglaston, both of, N.Y. |
|---|---|---|
| [21] | Appl. No. | 816,978 |
| [22] | Filed | Apr. 17, 1969 |
| [45] | Patented | Aug. 17, 1971 |
| [73] | Assignee | Fairchild Hiller Corporation<br>Hagerstown, Md. |

[54] APPARATUS FOR CONTROLLING TEMPERATURE RELATIVE TO HUMIDITY
7 Claims, 6 Drawing Figs.

[52] U.S. Cl. .................................................. 236/44 C,
34/50, 73/336.5, 165/21, 340/235
[51] Int. Cl. .................................................... G05d 22/02,
F24f 3/14
[50] Field of Search .......................................... 236/44, 44
C, 44 E; 73/336.5; 165/21, 3; 340/235; 338/35, 14;
34/50

[56] References Cited
UNITED STATES PATENTS

| 2,707,880 | 5/1955 | Wannamaker, Jr. | 73/335 |
| 2,913,902 | 11/1959 | Ross | 73/336.5 |
| 3,070,062 | 12/1962 | Ohlheiser | 236/44 UX |
| 3,082,540 | 3/1963 | Hiltenbrand | 34/50 X |
| 3,196,682 | 7/1965 | Johnson, Jr. | 73/336.5 |
| 3,197,699 | 7/1965 | Johansen | 324/65 |
| 3,277,954 | 10/1966 | Meckler | 236/44 X |
| 3,428,890 | 2/1969 | Peck et al. | 340/235 X |
| 3,474,790 | 10/1969 | Benzinger | 236/44 X |

*Primary Examiner*—William E. Wayner
*Attorney*—Darby & Darby

ABSTRACT: Dewpoint control apparatus for maintaining the temperature of a gas within a predetermined zone above the dewpoint of the gas over a preselected temperature range, comprising a relative humidity sensing device, a control means, and a means for heating the gas. A relative humidity value of the gas is selected at which the temperature of the gas will always be within a small predetermined zone above dewpoint over the temperature range of interest. The control means is responsive to the relative humidity sensing device and causes the heating means to vary the temperature of the gas to maintain its relative humidity constant at said preselected value. The impedance of the preferred relative humidity sensing device changes as a function of temperature as well as relative humidity. Accordingly, a bridge circuit incorporating a plurality of thermistors is provided to compensate for such impedance changes by nulling the effect of temperature on the impedance of said relative humidity sensing device.

INVENTORS
VITO MICHAEL LIANTONIO
WILLIAM JOHN HOGAN

BY Darby & Darby

ATTORNEYS

APPARATUS FOR CONTROLLING TEMPERATURE RELATIVE TO HUMIDITY

The present invention relates to apparatus for controlling the temperature of a gas with respect to its relative humidity. More specifically, the present invention relates to dewpoint control apparatus intended to be used with an air-conditioning system such as, for example, the conventional air cycle machines generally used in aircraft.

Most modern aircraft are equipped with air conditioners which not only serve to enhance the comfort of the individuals within the aircraft but which also serve the important function of maintaining delicate electronic instruments at a suitable operating temperature. One conventional air-conditioning system is known as an air cycle system, and, depending upon aircraft environmental conditions, can produce a flow of refrigerated air as low as −100° F. This device operates by compressed air received from the aircraft engines and is essentially an all-mechanical device.

In the case of an air cycle machine, the presence of ice within the refrigerated airstream can substantially reduce the efficiency of the device inasmuch as the ice tends to clog the water separator commonly used with such devices, thus tending to block the passage of air.

The prior art has attempted to avoid this problem of icing by maintaining the temperature of the refrigerated airflow above its dewpoint. This can be done by estimating the maximum temperature which will be required to do this for a predetermined mission (pursuant to known criteria) and simply maintaining the airflow at this temperature. However, any such approximation obviously would not provide for maximum efficiency and, although the problem of icing can be solved in this way, the aircraft itself would not be operating at maximum efficiency. This would not be the case if it were possible to maintain the temperature of the refrigerated airflow just slightly above its dewpoint for all conditions of relative humidity. Devices which attempted to regulate temperature as a function of relative humidity in the past have included photosensitive means for sensing the frosting of a mirror or the like, and means for controlling the temperature of the airflow accordingly. Such devices are unsatisfactory because of a lack of precision as well as the prolonged response times involved.

Accordingly, it is an object of the present invention to provide improved apparatus for controlling the temperature of a gas with respect to its relative humidity, for example, to maintain the temperature of a refrigerated airflow within a small predetermined zone above its dewpoint over a wide range of temperatures.

Briefly, the above and other objects of the invention are accomplished by sensing the relative humidity of the airflow and controlling the airflow temperature so as to maintain the relative humidity at a preselected value, which value is such that throughout an extended temperature range the gas will always be within a predetermined zone above its dewpoint. The relative humidity sensing device employed is made of a material the electrical impedance of which varies as a function of relative humidity and temperature. Accordingly, pursuant to a further feature of the invention, means are provided to compensate for the impedance change of such material due to variations in temperature over the temperature range of interest so that the impedance change of the sensing device is essentially a pure function of the relative humidity of the gas.

The manner in which the foregoing and other objects of the invention are accomplished is more fully described below with reference to the attached drawings, wherein.

Figure 1:
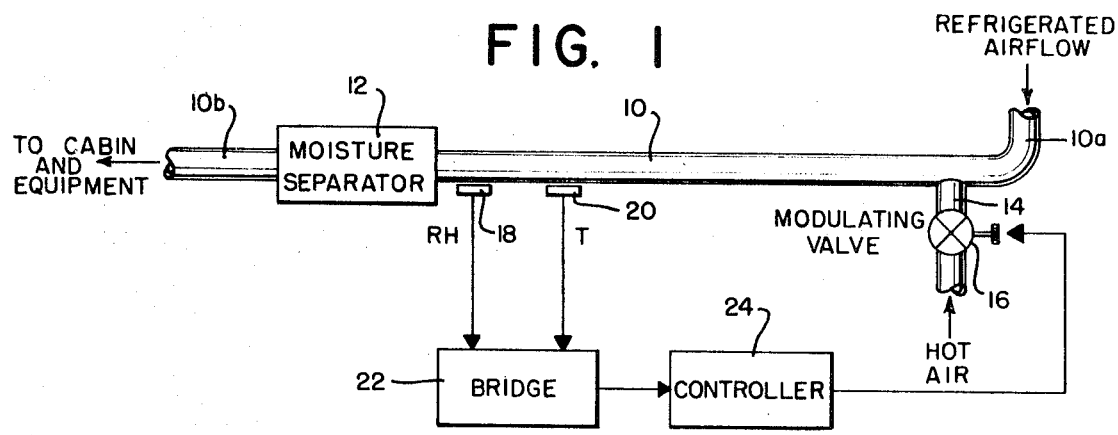
FIG. 1 is a block diagram of the invention.
Figure 2:
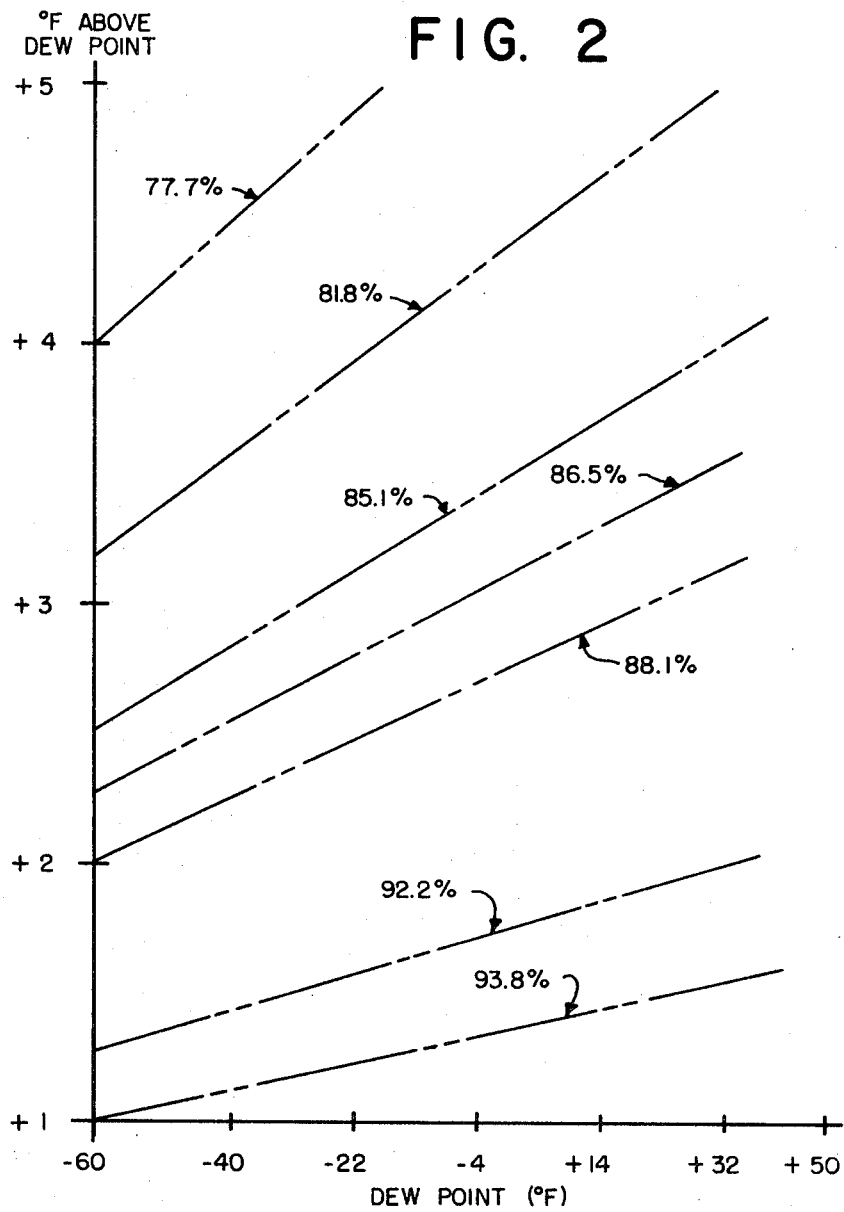
FIG. 2 is a chart of temperature relative to dewpoint versus dewpoint for various constant relative humidity lines.

The basic principles of the invention can be generally understood with reference to the block diagram of FIG. 1 and the chart of FIG. 2. In FIG. 1, refrigerated air is shown entering an air line 10 at 10a. The refrigerated airflow may be provided by an air conditioner such as an air cycle machine (not shown) and may vary over a substantial temperature range. Since electronic equipment generally should not be subjected to temperatures below −65° F., the minimum mixed air temperature of the airflow in duct 10 for a specific application may be −65° F.

The refrigerated air is passed to a moisture separator 12 which is also a standard device and has therefore been illustrated only diagrammatically. Under certain conditions of flight, air entering the inlet 10a may become supersaturated, containing more moisture than it can normally hold. If such air were to be directly introduced into the cabin (or elsewhere) it would cause fogging and condensation, which would be obviously undesirable. The moisture separator 12 removes a substantial portion of this extra moisture and thus prevents such fogging and condensation. The outlet line 10b from moisture separator 12 leads directly to the aircraft cabin and equipment for cooling purposes.

A hot air inlet duct 14 extends into the refrigerated airflow line 10, the flow of hot air being controlled by a hot air modulating valve 16 in duct 14. The hot air may be provided by any suitable source (not shown). By opening and closing valve 16, the flow of hot air into line 10, and thus the temperature of the air in line 10, may be controlled.

The valve controlling means is responsive to a relative humidity sensing means 18 and a temperature sensing means 20, schematically shown as being physically located between moisture separator 12 and hot air duct 14. The sensing means 18 and 20 are connected in circuit with a bridge 22 which produces an output, as explained below, which indicates whether the relative humidity of the gas within line 10 is above or below the preselected value. A controller 24 suitably amplifies the output from bridge 22 so that the signal can be used to control the modulator valve 16.

The reason it is possible to operate at a constant relative humidity can be explained with reference to FIG. 2, which shows the relationship between constant relative humidity curves and degrees F. above the dewpoint for each respective relative humidity curve throughout the temperature range of interest. If this temperature range of interest is assumed to be −60° F. to 32° F., for a constant relative humidity of 86.5 percent, the temperature of the gas will always be from about 2.2° F. (at −60° F.) to about 3.25° F. (at 32° F.) above dewpoint. Stated in other words, if the relative humidity of the gas within refrigerated air line 10 can be maintained at 86.5 percent, the gas will always be within a small predetermined zone above its dewpoint, regardless of temperature fluctuations between −60° F. and 32° F. This relative humidity value is arbitrarily chosen with a view toward optimizing considerations of maximum cooling and minimum likelihood of icing. Obviously other values can be selected.

The problem of automatically maintaining a constant relative humidity over a wide temperature range is a complex one inasmuch as there are presently no commercially available devices which can be used to provide an electrical signal indicative of relative humidity independent of temperature. In the preferred embodiment of the invention, a relative humidity sensing device such as shown in U.S. Pat. No. 2,728,831 of Pope, dated Dec. 27, 1955, is used. This device consists of a base of an electrically insulating, highly crossed-linked, organic polymer, a thin surface layer of which, only a few microns deep, has been treated to present an ion-exchange area, the stationary pole groups in such area comprising an integral part of the underlying polymeric matrix. The thin surface layer, when exposed to water vapor absorbs water rapidly, reaching equilibrium within seconds. Mobile ions freed upon the intake of water furnish the means for electrolytic conduction when a voltage is impressed across a portion of the ion exchange surface layer. Since the conductivity of the element varies as a function of water vapor absorption, it may be used as a relative humidity sensing device.

A difficulty involved in using this relative humidity sensing device is that its conductivity not only varies with relative humidity but also varies substantially as a function of temperature. For example, referring to FIG. 3, curve 30 shows the impedance variation of a relative humidity sensor as disclosed in the aforementioned Pope patent as a function of dewpoint plus 3° F. over the temperature range of interest (−60° F. to 32° F.). In this range, the impedance varies from about 1,000k ohms to approximately 2k ohms. Thus, special means must be provided to compensate for this change in impedance due to temperature so that an output signal can be provided which is only a function of relative humidity. For this purpose, the bridge circuit of FIG. 4 is employed.

Figure 4:
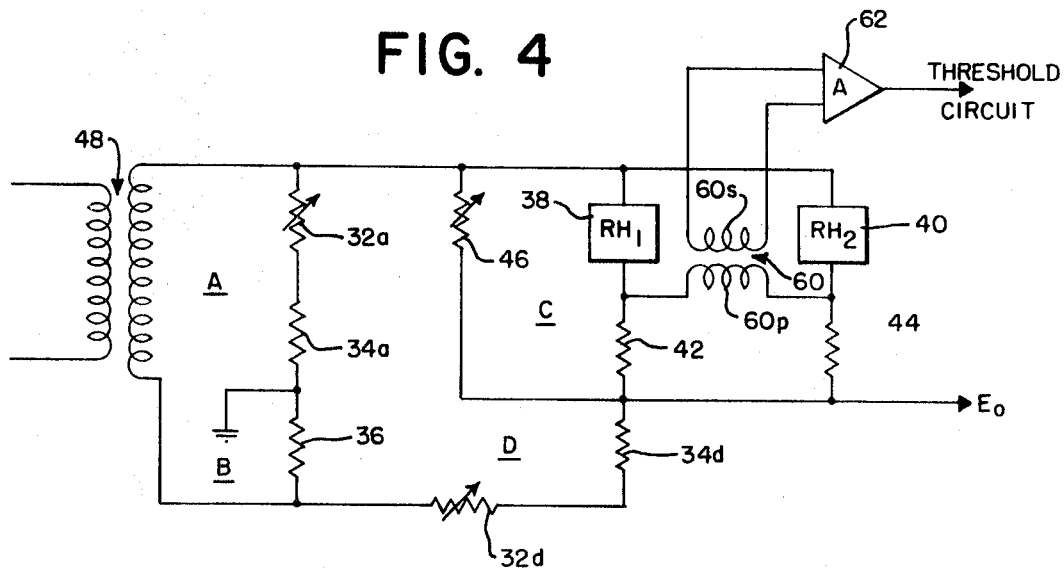
FIG. 4 is a circuit diagram of a preferred embodiment of a circuit adapted to compensate for the impedance changes of the relative humidity sensor due to temperature.

The bridge circuit of FIG. 4 consists essentially of four branches labeled A, B, C, and D. Branches A and D are identical and include respective thermistors 32a and 32d in series with resistors 34a and 34d. The branch B consists of a resistor 36. Branch C includes three parallel arms, two of which include respective relative humidity sensing devices 38 and 40 (such as disclosed in the aforementioned Pope U.S. Pat. No. 2,728,831) connected in series with respective resistors 42 and 44. The use of two separate relative humidity sensing devices is a contamination-sensing feature which is described in detail below. The third arm of branch C consists of a thermistor 46.

The energizing voltage for the bridge is applied across branches A and B (and branches C and D) which are connected to the secondary of a transformer 48. The junction of branches A and B is grounded and the output voltage ($E_0$) from the bridge is taken from the junction of branches C and D. The use of alternating voltage is necessary when using the preferred sensors in order to prevent polarization of the relative humidity sensors 38 and 40.

The operation of the bridge is such that when the impedance product of branches A and D is equal to the impedance product of branches B and C, there is no output voltage $E_0$ When the bridge is unbalanced (i.e. the impedance product of branches A and D does not equal that of branches B and C), a voltage output will be produced, the phase of which is indicative of the direction in which such unbalance occurs, i.e. whether the control temperature is higher or lower than its preselected value. Mathematically, the foregoing may be described as follows:

When the bridge is balanced (i.e. relative humidity is 86 percent), $ZA_AZ_D=Z_BZ_C$ When it is necessary to add hot air (i.e. relative humidity is too high), $$Z_AZ_D>Z_BZ_C$$

When it is necessary to reduce the amount of heat being added (i.e. relative humidity is too low), $$Z_AZ_D<Z_BZ_C$$

Parenthetically, it is noted that although the impedance of branches A, B and D is purely resistive while the impedance of branch C includes capacitive and inductive components, the nature of the impedance is not material for purposes of the present invention and in the following explanation the impedance of branch C is treated as a lump sum regardless of its reactive components.

Figure 3:
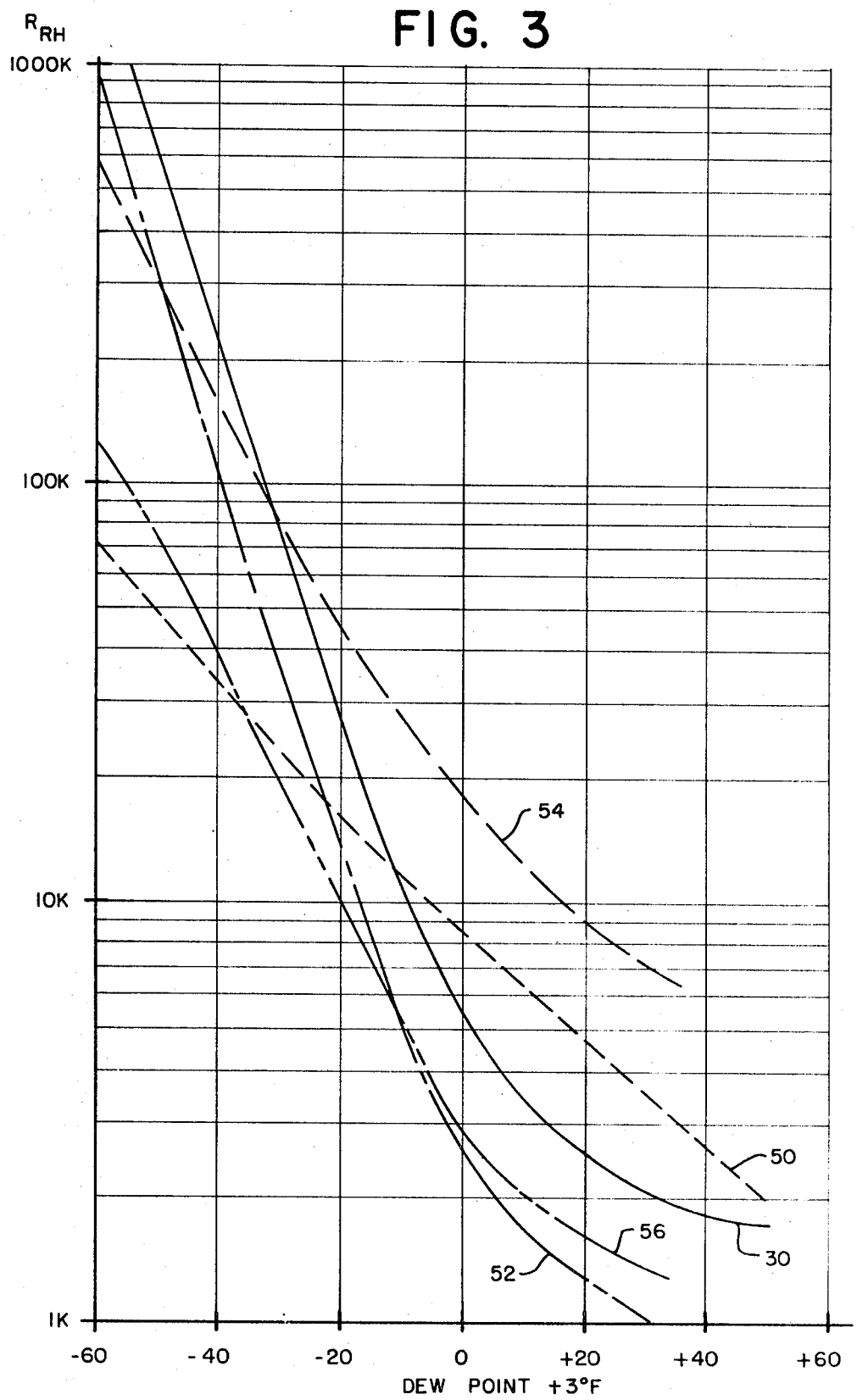
FIG. 3 shows different curves of impedance versus temperature for different combinations of the circuit elements of FIG. 4.

An explanation of how the bridge circuit of FIG. 4 accomplishes the desired objective of "nulling" or compensating for impedance changes of the relative humidity sensor due to temperature is now set forth with reference again to the impedance versus temperature charts of FIG. 3.

As indicated previously, the impedance-temperature characteristics of a single relative humidity sensor such as 38 or 40 is shown by the curve 30. This curve is achieved by inserting a humidity sensor in a series of controlled environments 3° F. above respective dew points. Sufficient points are taken to enable a curve of sensor impedance versus dewpoint plus 3° F. to be plotted. A single thermistor such as 32a, d or 46 will have the impedance versus temperature characteristic shown by the curve 50. As also noted previously, it is desired for purposes of contamination-sensing to employ two relative humidity sensing devices 38 and 40. The impedance-temperature characteristic of a parallel combination of sensors is shown by the curve 52.

The bridge network illustrated in FIG. 4 effectively compensates for the impedance change (resulting from temperature effects alone while maintaining basically a constant 86 percent humidity representative of control 3° F. above the dewpoint) by causing the product of the impedances in branches A and D to approximate the relative humidity sensing impedance characteristic in branch C (multiplied by a constant impedance in branch B) throughout the temperature range of interest (−60° F. to 32° F.). The product of the impedances of thermistors 32a and 32d (each of which is in series with a fixed resistor 34a or 34d) is shown by the curve 54. The effect of the fixed resistors 34a and 34d is to "flatten" the curve at higher temperatures in order to more closely approximate the relative humidity sensor impedance versus temperature curve 52. The fixed resistors 42 and 44 are placed in series with the relative humidity sensing devices 38 and 40, for contamination monitoring purposes. Additionally, the parallel connected thermistor 46 across the entire relative humidity sensing device further tends to reduce the slope of the impedance versus temperature curve of the branch C predominantly at cold temperatures. The resultant curve of branch C where the fixed resistors 42 and 44 were equal to 800 ohms is shown as the curve 56. This curve 56 also, of course, represents the impedance of the branch C.

A comparison of curves 54 and 56 indicates that the two are essentially similar in shape. Hence, if the impedance of branch C is multiplied by a constant value (i.e. fixed resistor 36) at all temperatures, the resultant impedance (i.e. the product of $Z_B$ and $Z_C$ will be essentially equal to the impedance characteristic represented by curve 54 (i.e. the product of $Z_A$ and $Z_D$. This means, referring back to the bridge circuit of FIG. 4, that if the relative humidity remains constant, e.g. 86 percent, changes in temperature will not affect the output voltage $E_0$ from the bridge. Stated in other words, it is only impedance changes of the relative humidity sensor 38, 40 not caused by temperature which will unbalance the bridge. As stated previously, the voltage output $E_0$ for such unbalanced conditions will be employed by controller 24 (FIG. 1) to operate the hot air modulator valve 16.

The parallel relative humidity sensors 38 and 40 are used to lessen the possibility that contamination of the relative humidity sensing device may cause a change in impedance and thus an erroneous control. Since the impedance versus temperature curve and the relative humidity versus temperature curve for the sensing devices 38 and 40 are identical within component tolerances, and since resistors 42 and 44 are identical within such tolerances, under normal conditions of operation practically the identical current will flow through the relative humidity sensors 38 and 40. One of the sensors has a filter (not shown) covering it. If the unfiltered sensor should become contaminated by dirt or any foreign matter, such that its impedance versus temperature characteristic changes, the current flow through the sensors 38 and 40 will differ. Accordingly, this unbalanced condition can be sensed by the primary 60b of a transformer 60 coupled between the respective junctions of the relative humidity sensor 38 and resistor 42 and the junction of sensing device 40 and resistor 44. When the current in these two series branches differs, there will be a voltage across the transformer primary 60p which is coupled by the secondary 60s of transformer 60 to a standard threshold circuit 62. The output of circuit 62 can be used either to provide an indication that the system is not functioning properly or to automatically control the hot air modulating valve 16 (FIG. 1) by means (not shown) to bring the temperature of the airflow in line 10 up to a temperature warmer than 32° where there is no possibility of icing.

Figure 5:
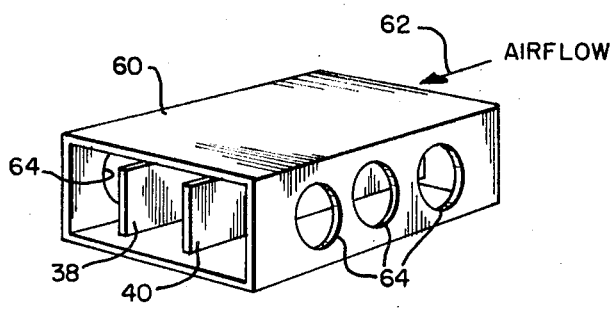
FIG. 5 is a diagrammatic perspective view of the housing means for the preferred relative humidity sensing means.

The mechanical configuration of the relative humidity sensing devices 38 and 40 is shown in FIG. 5. Each relative humidity sensing device has the physical appearance of a thin sheet with the two devices being vertically mounted so that they are parallel within a rectangular frame 60. The frame 60 is mounted within the air line 10 (FIG. 1) so that the airflow is in the direction shown by arrow 62. The vertical walls of frame 60 may include apertures 64 to assure proper exposure of the relative humidity sensors 38 and 40 to the refrigerated airflow. The sensors, of course, are electrically connected as shown in FIG. 4 by conventional conductors which are not illustrated in FIG. 5.

Figure 6:
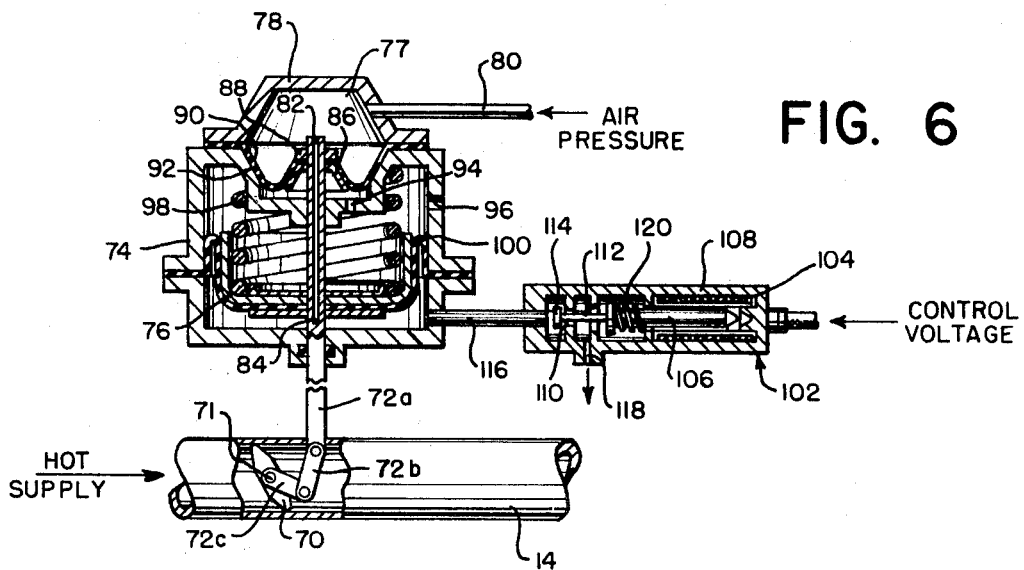
FIG. 6 is a side view partially in section showing the preferred hot air modulator valve of the invention.

The preferred embodiment of the modulating valve is shown in FIG. 6. This valve, in its essential aspects, is similar to the valve construction of U.S. Pat. No. 2,840,094 of Taplin though modified in certain respects for purposes of this invention.

The valve comprises a butterfly valve 70 pivotally mounted on an axle 71 within the hot air line 14 to control the flow of hot air. Valve 70 is connected by a three arm linkage 72a, 72b and 72c to a valve actuator which causes the desired valve control.

The actuator includes a generally cylindrical housing 74 in which a cup-shaped diaphragm 76 is mounted for vertical movement. The upper arm 72a of linkage 72 extends through the center of diaphragm 76 and through the uppermost portion of the housing 74 into a compartment 77 which is enclosed by a cap member 78. A duct 80 is connected to the compartment 77 within cap member 78 and permits a source of air or supply air pressure to be introduced thereto by means which are not herein illustrated.

The upper portion of linkage 72a includes a central duct 82 which extends from the top of the linkage 72a down to a point below diaphragm 76 within housing 74 into communication with this space beneath the diaphragm by means of a restrictor aperture 84. At the top of the linkage 72a an annular shelf 86 is secured by a sealing means 88. The inner periphery of an annular, flexible diaphragm 90 (of rubber, for example) is secured between seal 88 and the top of shelf 86 with the outer periphery of diaphragm 90 secured between the top of housing 74 and the bottom of cap member 78. A substantial area of diaphragm 90 rests on the top of shelf 86 and on a beveled surface 92 of the uppermost portion of housing 74. Diaphragm 90 permits linkage arm 72a to move vertically with the area of the diaphragm exposed to the supply air pressure from duct 80 changing accordingly.

Two apertures 94 and 96 within housing 74 expose the underportion of diaphragm 90 to "atmosphere" to nullify effects on the valve due to atmospheric pressure changes. A coil spring 98 biases the cup-shaped diaphragm 76 in a downward direction. The portion of the valve actuator above diaphragm 76 is sealed from the portion therebelow by means of an annular seal member 100 adapted to ride the interior of the housing 74 when the diaphragm 76 is moved.

The actuator for the valve 70 is controlled by a linear proportional solenoid valve 102 which includes a coil 104 adapted to position a core 106 in response to an electrical signal from the controller unit 24 (FIG. 1). The solenoid valve 102 is retained within a cylindrical casing 108 which is shaped to form a central restrictor opening 110 through which an extension 112 of core 106 passes. Extension 112 terminates in a flat head 114 which defines the size of the restrictor opening 110, depending upon its position. A coil spring 120 biases the core 106 to an initial position within the casing 108.

A duct 116 connects the portion of housing 74 beneath diaphragm 76 with the interior of the solenoid casing 108, and a vent 118 exhausts to atmosphere.

The position of the butterfly valve 70, and thus the flow of hot air, is dependent upon the position of the diaphragm 76.

The position of diaphragm 76, in turn, is dependent upon a force balance between the control air pressure against diaphragm 76 and the opposing pressure applied by the mechanical spring 98 plus the supply air pressure against diaphragm 90. The forces applied by the supply and control air pressure are dependent upon two factors. The first is the pressure differential between the respective restrictor openings 84 and 110 (it is recalled that the supply air pressure is applied through the duct 82 and restrictor openings 84 and 110 to the vent 118). The second is the variable area diaphragm 90 which readjusts the actuator force balance level as the supply air pressure changes. This latter feature is necessary because the supply air pressure may change as a function of temperature or other variable. If a purely mechanical force balance level were used, this change in supply air pressure would correspondingly affect the position of valve 70. If the relative humidity signal is such that the solenoid coil 104 positions coil 106 so as to increase the area of restrictor 110, then the pressure differential between the restrictors 84 and 110 increases and the diaphragm 76 in linkage 72 moves downwardly to tend to close the valve 70. If the relative humidity sensor signal causes the coil 104 to be energized so as to close the opening of the variable restrictor opening 110, the pressure differential across the restrictors decreases, pushing the diaphragm 76 and linkage 72 in an upward direction to open the valve 70 and increase the flow of hot air.

The invention is not limited to the embodiment disclosed herein and, in fact, can be used for purposes other than controlling temperature relative to dewpoint. In general, the principles of the invention can be used to maintain a preselected relationship between temperature and relative humidity wherein the relative humidity is maintained at a preselected value relative to temperature. It is thus possible, and even contemplated, that the principle of the invention could be used to vary relative humidity in a predetermined way relative to temperature since once the desired curve of humidity (or impedance) versus temperature has been determined, a bridge circuit can be fabricated to "match" that particular curve. Such a humidity versus temperature characteristic is predetermined by inserting the humidity sensor in a series of controlled environments e.g. 3° F. above a series of respective dew points. If enough impedance versus 3° F. above dewpoint measurements are made, a characteristic curve can be plotted. It is then possible to match this curve using thermistor or other temperature-sensitive devices whether or not relative humidity is maintained constant. Of course, the specific means for varying the temperature (including by cooling, if desired) of the gas is not a critical feature of the basic invention although the illustrated embodiment of the valve control has certain highly desirable features. Other modifications of the invention will also be obvious to those skilled in the art.

We claim:

1. Apparatus for maintaining a preselected relationship between the temperature of a gas and its relative humidity, comprising means for producing an electrical signal representative of the relative humidity of the gas, said signal producing means including a relative humidity sensor having an electrical impedance which varies as a function of relative humidity and temperature, and means for nullifying the effect of temperature changes on the impedance of said relative humidity sensor, control means responsive to the output of said signal producing means for producing a control voltage which represents the extent to which the relative humidity of the gas differs from a preselected relative humidity for any temperature within a preselected temperature range, and means responsive to said control means for varying the temperature of said gas to cause said relative humidity to approach said preselected relative humidity.

2. Apparatus according to claim 1, wherein said nullifying means includes a temperature sensor having an impedance which varies as a function of temperature, said temperature sensor and relative humidity sensor being connected in a bridge circuit.

3. Apparatus according to claim 2, including additional impedance means associated with said relative humidity sensor and temperature sensor for adjusting the impedance versus temperature characteristics of said sensors.

4. Apparatus according to claim 3, wherein said bridge circuit includes two pairs of opposite branches, with temperature sensors in two of said opposite branches, said relative humidity sensor being in one of the other branches and further impedance means in the last of said branches for substantially equalizing said impedance versus temperature characteristics.

5. Apparatus according to claim 1, including a second relative humidity sensor in parallel with said first named relative humidity sensor.

6. Apparatus according to claim 1 wherein said temperature varying means includes pneumatic valve means for introducing a gas having a preselected temperature.

7. Apparatus for maintaining the temperature of a gas within a predetermined zone above the dewpoint of the gas throughout a preselected temperature range, comprising
first means for producing a first electrical quantity which is a function of the temperature of said gas,
second means for producing a second electrical quantity which is a function of the relative humidity of said gas, said first and second means producing substantially equal quantities at any temperature within said preselected range at a specified relative humidity, said specified relative humidity being selected so that when said gas has said specified relative humidity and is at a temperature within said preselected range, its temperature is within said predetermined zone,
comparison means for comparing said first and second quantities, and
means responsive to said comparison means for varying the temperature of said gas until said first and second quantities are equal.

PO-1050
(5/69)

UNITED STATES PATENT OFFICE
CERTIFICATE OF CORRECTION

Patent No. 3,599,862      Dated August 17, 1971

Inventor(s) William Hogan and Vito Liantonio

It is certified that error appears in the above-identified patent and that said Letters Patent are hereby corrected as shown below:

Column 3, line 4: change "absorption" to --adsorption-- line 52, Change "$ZA_A$" to --$Z_A$--

Column 4, line 41, after "$Z_C$" insert a closing parenthesis.

Column 4, line 42, after "$Z_D$" insert a closing parenthesis.

Signed and sealed this 12th day of December 1972.

(SEAL)
Attest:

EDWARD M. FLETCHER, JR.
Attesting Officer

ROBERT GOTTSCHALK
Commissioner of Patents